(12) United States Patent
DeLuca et al.

(10) Patent No.: US 10,094,679 B1
(45) Date of Patent: Oct. 9, 2018

(54) GENERATING A NAVIGATION ROUTE REFERENCING DIGITAL SIGNAGE

(71) Applicant: INTERNATIONAL BUSINESS MACHINES CORPORATION, Armonk, NY (US)

(72) Inventors: Lisa Seacat DeLuca, Baltimore, MD (US); Dana L. Price, Surf City, NC (US); Aaron J. Quirk, Raleigh, NC (US); Shelbee D. Smith-Eigenbrode, Thornton, CO (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/611,950

(22) Filed: Jun. 2, 2017

(51) Int. Cl.
*G01C 21/00* (2006.01)
*G01C 21/36* (2006.01)
*G01C 21/34* (2006.01)

(52) U.S. Cl.
CPC ..... *G01C 21/3644* (2013.01); *G01C 21/3446* (2013.01); *G01C 21/3682* (2013.01)

(58) Field of Classification Search
CPC ............ G01C 21/3644; G01C 21/3446; G01C 21/3682
See application file for complete search history.

(56) References Cited

U.S. PATENT DOCUMENTS

| 6,401,027 | B1 * | 6/2002 | Xu ................... G08G 1/0104 340/988 |
| 6,675,165 | B1 | 1/2004 | Rothschild |
| 7,831,379 | B2 | 11/2010 | Nathan et al. |
| 7,941,269 | B2 | 5/2011 | Laumeyer et al. |
| 8,862,500 | B1 * | 10/2014 | Mayfield ................ G06Q 30/02 705/14.58 |
| 9,460,453 | B2 | 10/2016 | Rider et al. |
| 9,530,197 | B2 | 12/2016 | Cabrera-Cordon et al. |
| 2002/0120397 | A1 | 8/2002 | Kepler |

(Continued)

FOREIGN PATENT DOCUMENTS

| EP | 2865994 A1 | 6/2012 |
| WO | WO2016105900 A1 | 6/2016 |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Hussein A El Chanti
(74) *Attorney, Agent, or Firm* — Michael A. Petrocelli, Esq.; Kevin P. Radigan, Esq.; Heslin Rothenberg Farley & Mesiti P.C.

(57) ABSTRACT

Navigation system assistance to a user within an area is provided by ascertaining location data and content of digital signage within the area. Further, based on the system receiving a request from a user for navigation directions to a destination location from a starting location, a navigation route is generated for the user to the destination location. The navigation route passes, at least in part, within the area, and the navigation route includes reference to one or more digital signs of the digital signage within the area, and a location of the one or more digital signs within the area in relation to the navigation route.

20 Claims, 14 Drawing Sheets

(56) References Cited

U.S. PATENT DOCUMENTS

| | | | |
|---|---|---|---|
| 2002/0154174 A1* | 10/2002 | Redlich | G06F 3/04815 715/848 |
| 2011/0130956 A1* | 6/2011 | Tracton | G01C 21/3644 701/533 |
| 2012/0197713 A1* | 8/2012 | Stroila | G01C 21/3614 705/14.49 |
| 2013/0159869 A1* | 6/2013 | Faraji | G06F 3/0482 715/738 |
| 2014/0032110 A1* | 1/2014 | Simring | G01C 21/34 701/533 |
| 2014/0067549 A1 | 3/2014 | Park et al. | |
| 2015/0084838 A1 | 3/2015 | Chang et al. | |
| 2015/0245738 A1* | 9/2015 | Carvalho | A47J 37/049 426/233 |
| 2015/0276421 A1 | 10/2015 | Beaurepaire et al. | |
| 2015/0294347 A1* | 10/2015 | Placide | G06Q 30/0242 705/14.41 |
| 2016/0027266 A1* | 1/2016 | McDonagh | G08B 7/062 340/815.4 |
| 2016/0252363 A1* | 9/2016 | Tertoolen | G01C 21/3635 701/410 |
| 2016/0272065 A1* | 9/2016 | Tsushima | B60K 35/00 |
| 2016/0379485 A1 | 12/2016 | Anastassov et al. | |
| 2017/0108342 A1* | 4/2017 | Foreman | G01C 21/3415 |
| 2017/0193312 A1* | 7/2017 | Ai | G08G 1/00 |
| 2017/0308827 A1* | 10/2017 | Sasaki | G06Q 10/0631 |
| 2017/0361759 A1* | 12/2017 | Kim | B60Q 1/08 |
| 2018/0025461 A1* | 1/2018 | Kadali | G01C 21/206 |
| 2018/0043923 A1* | 2/2018 | Yamada | B62D 1/22 |
| 2018/0053215 A1* | 2/2018 | e Costa | G06Q 30/0266 |
| 2018/0072218 A1* | 3/2018 | Sweeney | G05D 1/0212 |
| 2018/0075486 A1* | 3/2018 | Hannant | G06Q 30/0261 |

OTHER PUBLICATIONS

Clinch, Sarah, "Smartphones and Pervasive Public Displays", IEEE Pervasive Computing, vol. 12, Issue 1, Jan.-Mar. 2013, (p. 92-95).

Schwartges, et al., "Labeling Streets Along a Route in Interactive 3D Maps Using Billboards", AGILE 2015, Geographic Information Science as an Enabler of Smarter Cities and Communities, Springer International Publishing Switzertland, 2015, (pp. 1-19).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

Ruan, et al., "A Geographic Analysis of Optimal Signage Location Selection in Scenic Area", The International Archives of the Photogrammetry, Remote Sensing and Spatial Information Sciences, vol. XLI-B2, 2016, (pp. 477-481).

* cited by examiner

300

301

GENERATING A NAVIGATION ROUTE REFERENCING DIGITAL SIGNAGE

BACKGROUND

Following directions provided by a navigation system in an unfamiliar and heavily trafficked area may be difficult for many users, such that one or more users may find it difficult to navigate within or through the area. Depending on the region, the person following the navigation route may not even speak the local language.

Conventionally, a navigation system provides an indication of roads or paths available, and at each turn a particular road or path to be taken to arrive at the desired destination. The navigation system typically provides a shortest route between two locations, that is, between an origin location and a destination location, and generates the navigation route with turn-by-turn navigation directions and distances based on road numbers and/or names. In unfamiliar and heavily trafficked areas, however, a user may find it difficult to follow navigation route instructions constructed using this approach.

SUMMARY

Certain shortcomings of the prior art are overcome and additional advantages are provided through, in one or more aspects, the provision of a computer-implemented method of providing navigational assistance to a user. The method includes referencing, by a navigation system, location data of digital signage within an area, with the location data of the digital signage being accessible by the navigation system. Based on the navigation system receiving a request from the user for navigation directions to a destination location, the navigation system generates a navigation route for the user to the destination location. The navigation route passes, at least in part, within the area, and the navigation route includes reference to one or more digital signs of the digital signage within the area, and location of the one or more digital signs within the area in relation to the navigation route.

Advantageously, disclosed herein are a system, method, and computer program product which correlate or incorporate electronic infrastructure, such as stationary or mobile digital signs displaying electronic content, into the navigational guidance provided to a user. Further, the dynamic nature of the content of the digital signs, and the ability of the system to modify or control the content may be used to further direct a user along a navigation route, while potentially providing the user with personalized advertising, such as market-based advertising targeted to the individual user of the system. Advantageously, by the navigation system incorporating reference to digital signage into a navigation route, a user may be better able to identify and navigate through an unfamiliar and heavily trafficked area, since the digital signage may be easier for the user to see or reference. Also, as noted, the digital signage may advantageously be customized or modified by the system to facilitate guiding the user along the navigation route, and/or may be personalized to the user, for instance, by providing personalized advertising likely to catch the user's attention. Using existing digital infrastructure within an area, the navigation system is thus able to provide enhanced directions and guidance for the user through the area by incorporating reference to digital signs into a generated navigation route provided to the user. For instance, in one or more embodiments, the system may provide a navigation route which references location of one or more digital signs along the navigation route, as well as content, whether the original content of the digital sign, or a customized content provided by the system to attract the user's attention.

In one or more embodiments, the referencing may further include ascertaining by the navigation system content of the digital signage within the area, and the generating may include providing reference to the content of the one or more digital signs as part of the navigation route. As a specific example, the content may include one or more advertisements.

In one or more implementations, providing navigational assistance to a user may include modifying by the navigation system, at least in part, content of at least one digital sign of the one or more digital signs to facilitate guiding the user along the generated navigation route. By way of example, the modifying, at least in part, content of the at least one digital sign may include personalizing to the user at least part of the content of the at least one digital sign. In another embodiment, the user may be part of a group of users, and the modifying, at least in part, content of the at least one digital sign may include customizing to the group of users at least part of the content of the at least one digital sign. In one or more embodiments, the modifying, at least in part, content of at least one digital sign may include personalizing to the user advertising on the at least one digital sign.

In one or more implementations, providing navigational assistance to the user may further include activating, by the navigation system, highlighting of at least one digital sign of the one or more digital signs along the navigation route to highlight for the user the at least one digital sign referenced in the navigation route.

In one or more implementations, at least one digital sign of the digital signage within the area may be a movable digital sign. Further, in one or more embodiments, at least one digital sign of the digital signage within the area may be mounted on a vehicle within the area.

In one or more implementations, providing navigational assistance to the user may further include sending the navigation route to a navigation device of the user for display, wherein the display is to include a display of the reference to the one or more digital signs in the area in relation to the navigation route.

In one or more other aspects, a system is provided for providing navigational assistance to a user. The system includes a memory, and a processor communicatively coupled to the memory, wherein the system performs a method which includes referencing location data of digital signage within an area, wherein location data of the digital signage is accessible by the system. Based on the system receiving a request from the user for navigation directions to a destination location, the system generates a navigation route for the user to the destination location. The navigation route passes, at least in part, within the area, and the navigation route includes reference to one or more digital signs of the digital signage within the area, and location of the one or more digital signs within the area in relation to the navigation route.

In one or more further aspects, a computer program product is provided for providing navigational assistance to a user. The computer program product includes a computer readable storage medium having computer readable program code embodied therewith. The computer readable program code is executable by a processor to perform a method which includes referencing location data of digital signage within an area, and receiving a request from the user for navigation directions to a destination location. Based on receiving the request, the method includes generating a navigation route for the user to the destination location. The navigation route passes, at least in part, within the area, and the navigation route includes reference to one or more digital signs of the digital signage within the area, and location of the one or more digital signs within the area in relation to the navigation route.

Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, communication techniques, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for facilitating providing navigational assistance to a user.

A wide variety of computing devices currently exist which may operate as a navigation device, such as a global positioning system (GPS) navigation device or receiver. Conventionally, a navigation system provides a navigation path or route as a series of turn-by-turn navigation directions and distances based, for instance, on road numbers and/or road names. In unfamiliar and heavily trafficked areas, such as within a city, the user may find it difficult to follow such navigation route instructions.

Disclosed herein, in one or more aspects, are a computer-implemented method, system, and computer program product for generating a navigation route which includes reference to one or more digital signs that a user may pass along the route. Advantageously, the digital signage may be larger and easier for a user to identify and navigate by, particularly in unfamiliar and heavily trafficked areas. Also, the digital signage may advantageously be customized or modified by the navigation system to facilitate guiding the user along the navigation route, and/or may be personalized to the user, for instance, by providing personalized advertising likely to catch the user's attention. Using existing digital infrastructure within the area, the navigation system is thus able to provide enhanced directions and guidance for the user through the area by incorporating reference to one or more digital signs into the navigation route provided to the user, along with location of the one or more digital signs. Additionally, the navigation system may reference content of the digital sign(s) along the route, or customize the digital sign(s) to facilitate attracting the user's attention, and thereby guide the user along the navigation route. Various embodiments of these aspects of the present invention are described herein by way of example only.

Figure 1:
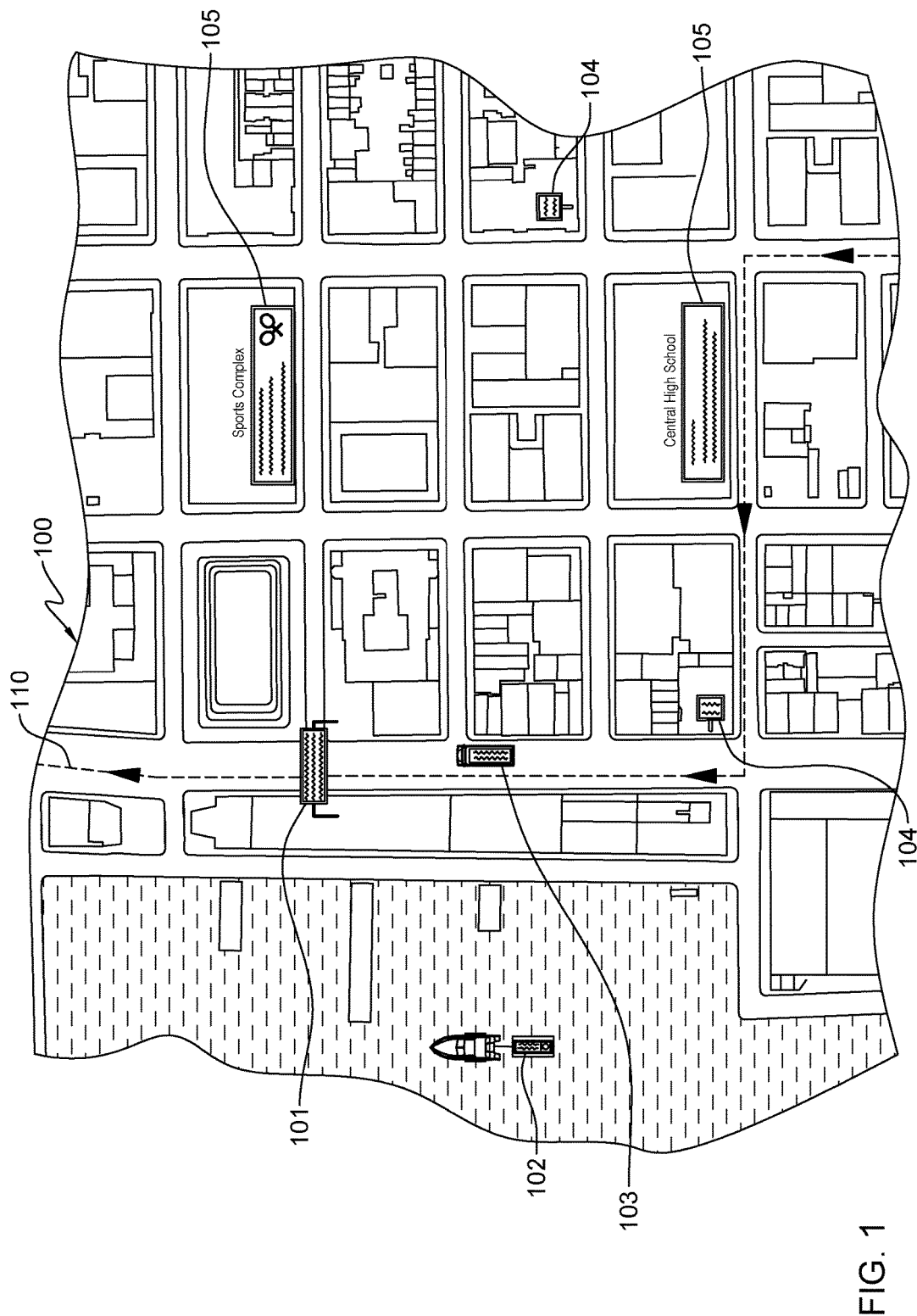
FIG. 1 is a representation of an area, such as a portion of a city, with digital signage, and illustrates a navigation route through the area which references, at least in part, one or more digital signs within the area, including location of the one or more digital signs in relation to the navigation route, in accordance with one or more aspects of the present invention.

FIG. 1 depicts one embodiment of an area 100, such as a portion of a city, through which a navigation route 110 is generated to facilitate directing a user to a desired destination location. Note in this regard that the navigation route may originate and/or terminate within the area, for instance, within the city, or the navigation route may simply pass through the area.

As depicted in FIG. 1, area 100 includes a digital infrastructure with a plurality of digital signs, referred to herein as digital signage. The digital signage may include digital signs or displays using any of a variety of technologies, including LCD, LED, projection technologies, etc., and may display content such as digital images, video, streaming media, information, advertisements, etc. Digital signage may be located in or associated with public spaces, transportation systems, retail stores, restaurants, corporate buildings, etc. Further, the digital signage may be fixed, such as mounted on a pedestal or other structure, or may be movable, such as rotatable, towable, etc. and still further may be mounted on a movable vehicle within the area.

By way of example, FIG. 1 depicts a digital sign 101 which extends over a street along which the generated navigation route 110 passes. Further, a movable digital sign 102 is depicted as being towed along a lake (in this example), and a digital sign 103 is located on a moving vehicle, such as a bus, traveling along the same street as navigation route 110. Further, multiple pedestal type digital signs 104 may be dispersed throughout area 100, as well as digital signs 105 located, for instance, in association with a building, such as a public school, entertainment venue, business, retail establishment, restaurant, etc. Note that digital signs 101-105 of FIG. 1 are presented by way of example only, and not by way of limitation.

Pursuant to the present invention, any digital sign in any location, whether fixed or movable within area 100 may be used or referenced when generating a navigation route, provided that the digital sign location and content are accessible by the navigation system. For instance, the one or more digital signs accessed by the navigation system may be proprietary to the system, or may be proprietary to an unrelated entity (in which case a license may have been obtained for the system to access the information and/or temporarily use the digital sign). Alternatively, the digital sign may be relatively fixed in content, as in part of the area environment itself.

As explained herein, in one or more implementations, the navigation system may be provided with the capability to temporarily dynamically modify advertisement, symbols, images, text, color, highlights, etc. of one or more digital signs along the navigation route, such as when the user is close to the digital sign to (for instance) facilitate guiding the user along the navigation route. By referencing, and even controlling, content of the digital signs, more effective navigation directions may be provided to the user to facilitate the user's travel through, for instance, an unfamiliar and heavily trafficked area.

Figure 2:
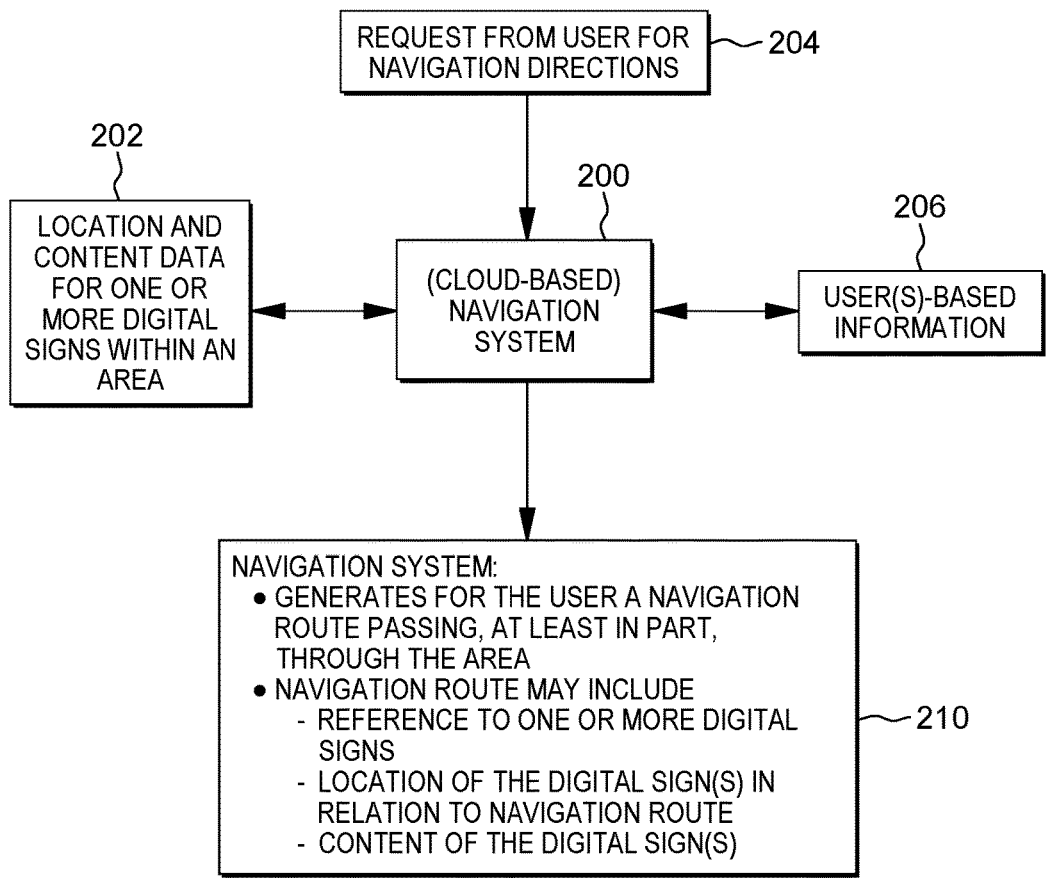
FIG. 2 depicts one embodiment of a system for providing navigational assistance to a user, in accordance with one or more aspects of the present invention.

FIG. 2 depicts one embodiment of a system and method for providing navigational assistance to a user, in accordance with one or more aspects of the present invention. As illustrated, the navigation system 200 may be, in one or more embodiments, at least partially cloud-based and may use a variety of existing technologies to facilitate generating, for instance, a GPS-based navigation route for a user to a destination location. In one or more other embodiments, the navigation system may be implemented, at least in part, within a large indoor facility, such as a convention hall or airport, etc., and other technologies may be used in place of, or in combination with GPS, such as beacon-based sensors, as well as other technologies to locate a user.

In one or more aspects, the systems, methods and computer program products disclosed herein enhance conventional navigation route generation by, for instance, supplementing the generated route with references to one or more digital signs along the route, as well as location of the digital signs in relation to the generated navigation route. Navigation system 200 may reference location data and content for one or more digital signs within an area 202, with the location data and content of the digital signage being accessible by the navigation system, such as prior agreement or license from one or more owners of the digital signage.

In operation, navigation system 200 receives a request from a user for navigation directions to a destination location, for instance, from a current or starting location 204. Based on receiving the request, the navigation system generates for the user a navigation route which may pass, at least in part, through an area with digital signage. The navigation route generated may include reference to one or more digital signs of the digital signage within the area, as well as location of the one or more digital signs within the area in relation to the navigation route. For instance, the navigation route may include, in part, reference to one or more digital signs with familiar imagery, logos, text, etc. along with more conventional GPS guidance. As a specific example, the navigation route may include a direction such as "turn right after the ABC digital sign". In one or more embodiments, navigation system 200 may also reference one or more databases with user-related information 206 in order to, for instance, facilitate tailoring to the user one or more displayed aspects of the content of one or more digital signs along the navigation route. For instance, navigation system 200 may identify through social media that the user is part of a group attending a conference, and based on this, may provide an image specific to the group for display within one or more digital signs along the navigation route. Note in this regard that, in one or more implementations, navigation system 200 may include or utilize artificial intelligence, machine learning, predictive analytics, etc., to, for instance, learn from available information related to the user (stored, for instance, in one or more databases) one or more interests of the user to facilitate customizing content of the digital sign to the user.

The customized or modified content of the digital sign(s) may thus be either personalized to the user to facilitate the user noticing the sign referenced in the navigation route, or personalized to a group of users to facilitate individuals within the group of users noticing the digital sign(s) referenced in the navigation route. In a further embodiment, an individual user's interests (or group of users' interests) may be ascertained to, for instance, customize advertising or other notices provided within the digital sign(s), either in place of or along with the identified content of the digital sign(s).

Figure 3A:
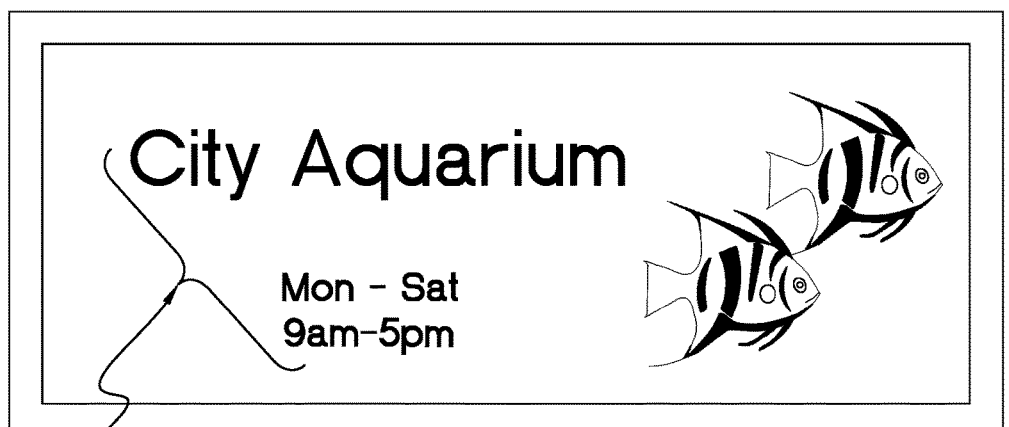
FIGS. 3A-3G depict various examples of a digital sign, with location and content accessible by a navigational system for inclusion in navigation directions for a user, as well as illustrating control of one or more aspects of the digital sign by the navigation system, in accordance with one or more aspects of the present invention.

By way of further example, FIGS. 3A-3G depict example digital signs, references to which could be incorporated into navigational directions, and used to assist a user in navigating within an area. By way of example, FIG. 3A depicts a digital sign 300 with content 301 advertising a city aquarium. In one or more embodiments, digital sign 300 may be associated with the aquarium, for instance, located in front of the aquarium or disposed remotely within the area, such as within a cityscape being traversed.

Figure 3B:
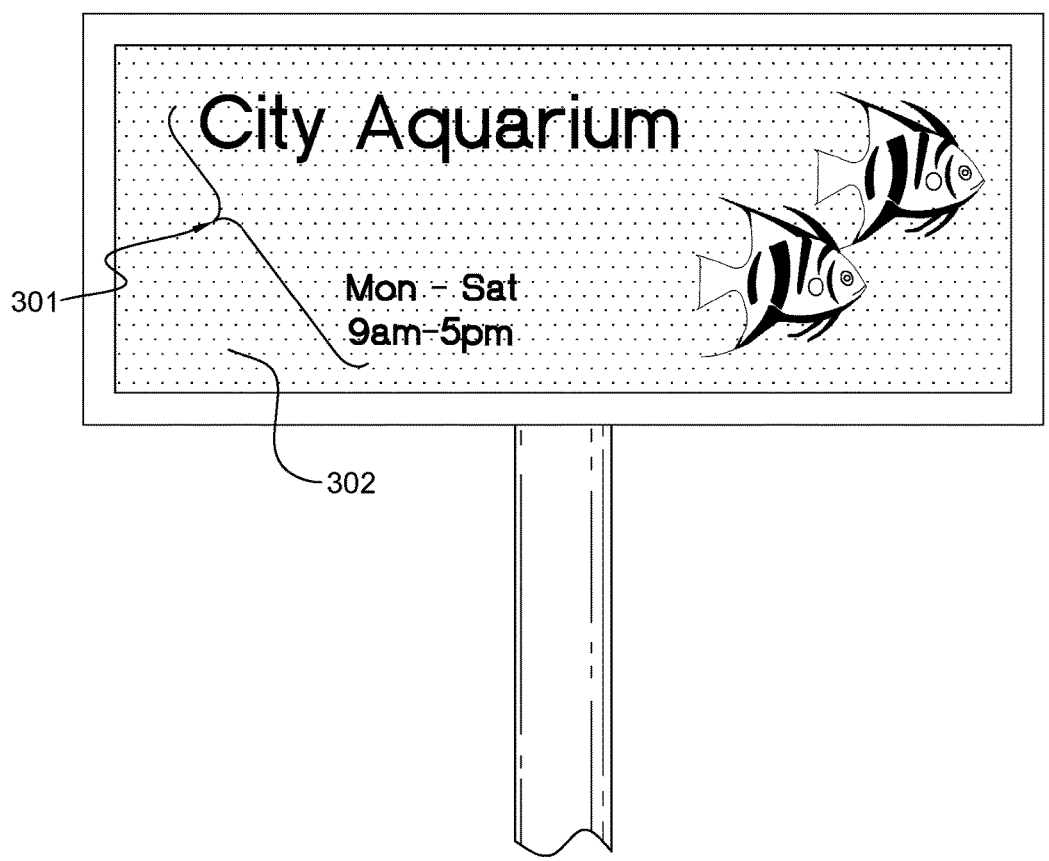

In FIG. 3B, digital sign 300 has its content modified by the system by, for instance, changing a background color 302 of display content 301. For instance, in one or more embodiments, the navigation system could change the background color 302 of one or more digital signs along the user's navigation route to facilitate drawing the user's attention to the sign(s). By way of example, the user may be provided with a navigation route which directs the user to look for digital signs with a green background. With the system timely modifying the background color of one or more digital signs to green along the navigation route through the area, the user is better able to follow the navigation directions through the area.

Figure 3C:
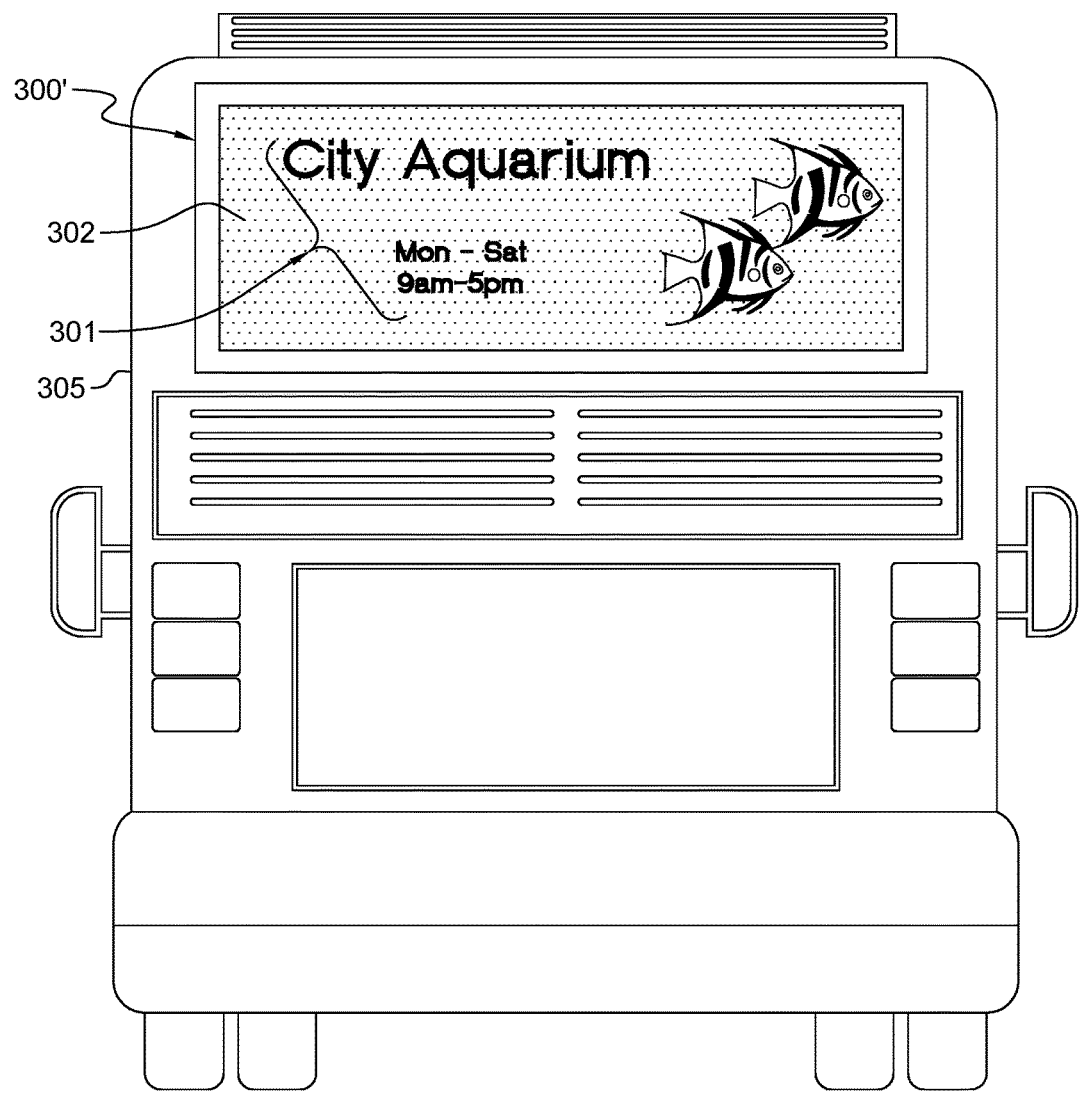

In FIGS. 3A & 3B, digital sign 300 is shown fixed on a pedestal, while in FIG. 3C, a digital sign 300' is shown mounted on a vehicle 305, such as a city bus. In one or more embodiments, the navigation system is able to ascertain a current location of vehicle 305, and this of digital sign 300' on the back of vehicle 305, and based on knowing the location of vehicle 305 at the time the user is passing along the navigation route, may modify content 301 by, for instance, changing background color 302 of digital sign to assist the user in navigating along the generated route, as explained herein.

Figure 3D:
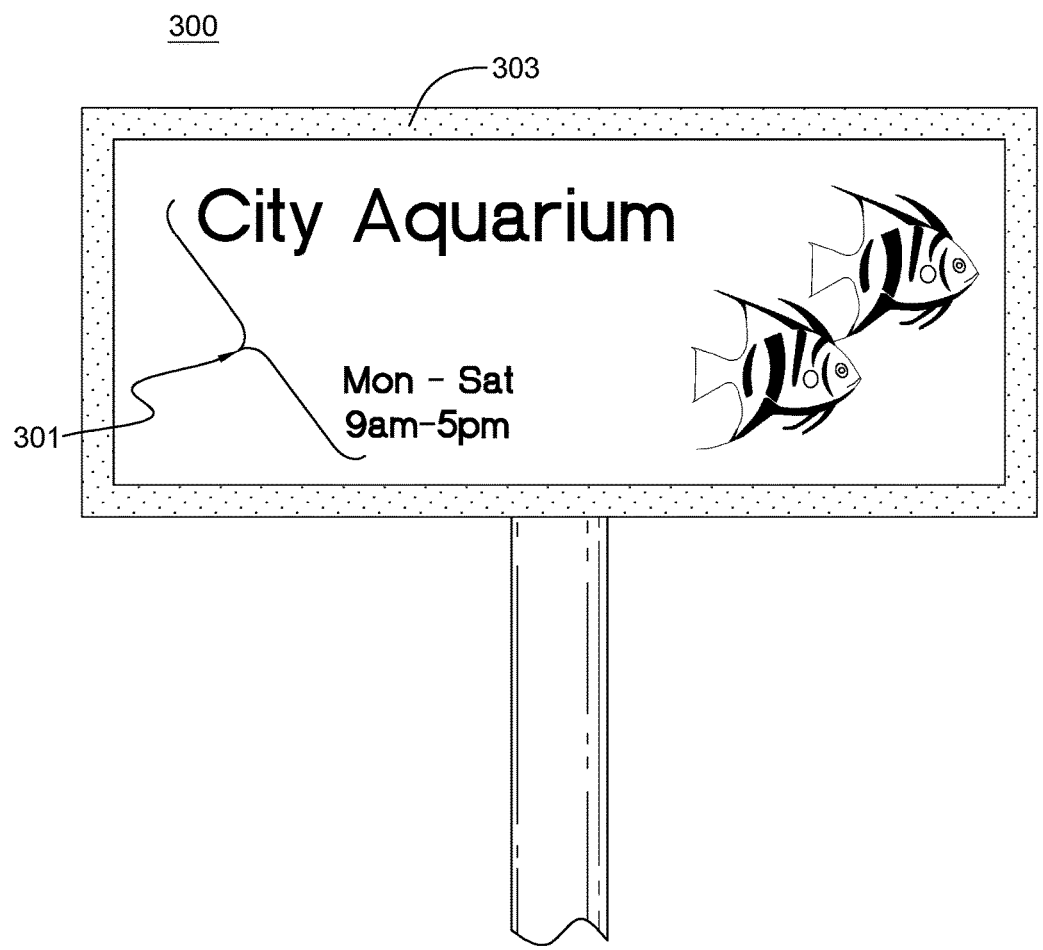

In FIG. 3D, digital sign 300 is shown to include a border 303 which may be electronically highlighted by the navigation system, for instance, provided with a particular color. In addition, the border color may be fixed or flashing, or include a moving pattern, etc., as desired in order to facilitate drawing the user's attention to digital sign 300 as the user travels along the navigation route. Note in this regard that the modification to digital sign 300 need only be present as the user approaches the digital sign, and may be terminated once the user passes the digital sign. In another embodiment, if the user is a part of a group, the modification to a digital sign may continue until, for instance, all members of the group have passed the digital sign, or for some interval of time within which users of the group should have passed the digital sign.

Figure 3E:
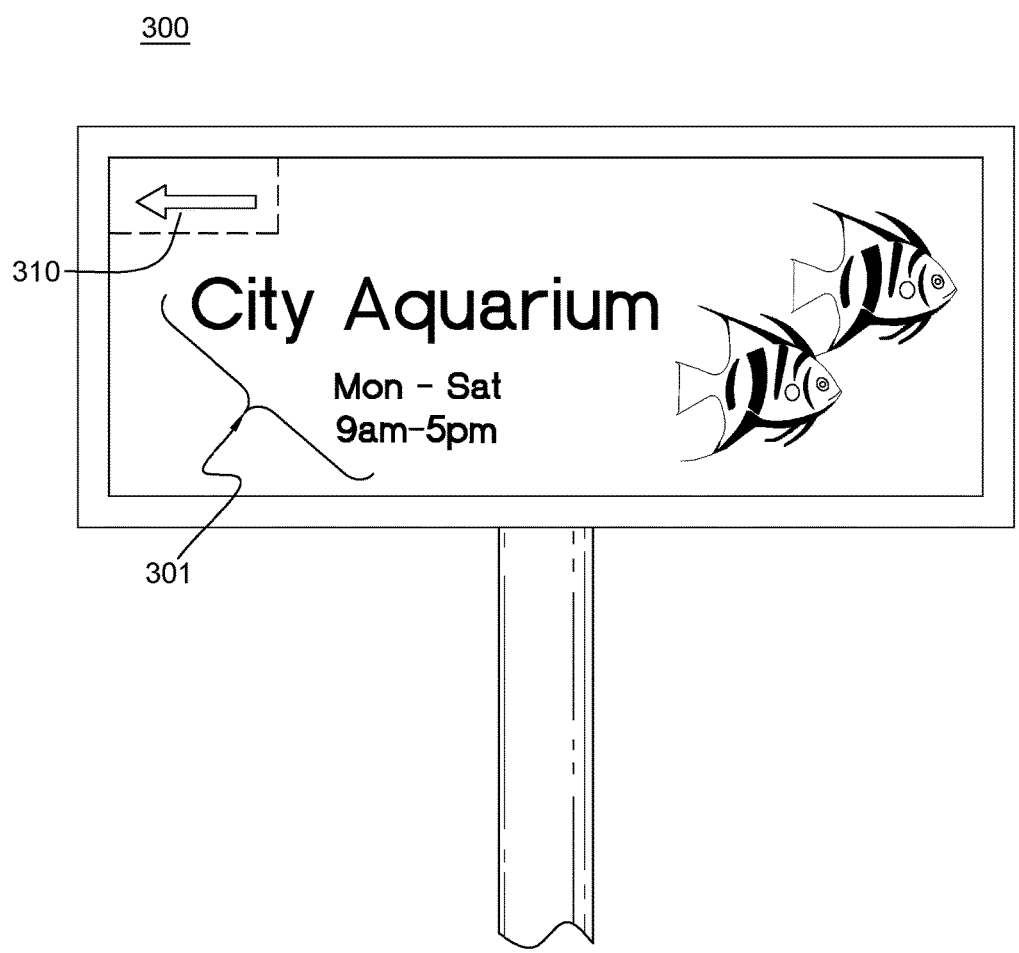

In FIG. 3E, the content 301 of digital sign remains but a portion 310 of digital sign 300 is provided with a modification which includes, in this example, a direction arrow to facilitate directing the user along the navigation route.

Figure 3F:
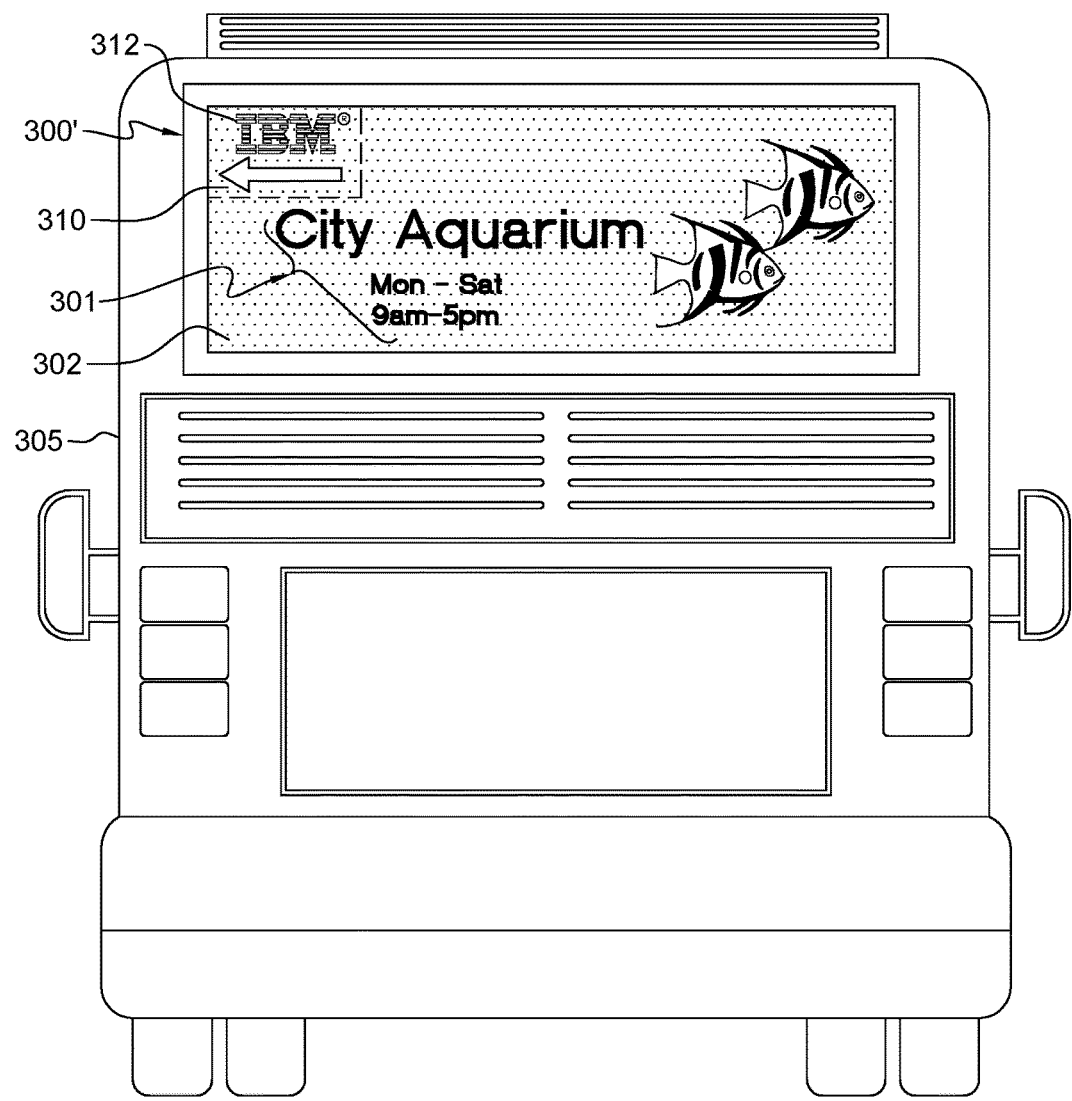

In the example of FIG. 3F, digital sign 300' mounted to vehicle 305 has both background 302 of content 301 modified to draw the user's attention, as well as portion 310 modified. In this case, portion 310 includes a directional arrow such as depicted in FIG. 3E, as well as, for instance, a group identifier 312 to facilitate directing a group of users along a navigation route. Note that the use of digital sign 300' as modified and described herein would apply while the digital sign is located along the navigation route of the user. Once the vehicle 305 moves away from the navigation route, or the user(s) is no longer in the vicinity of digital sign 300', then the digital sign 300' may be returned to its original content 301.

Figure 3G:
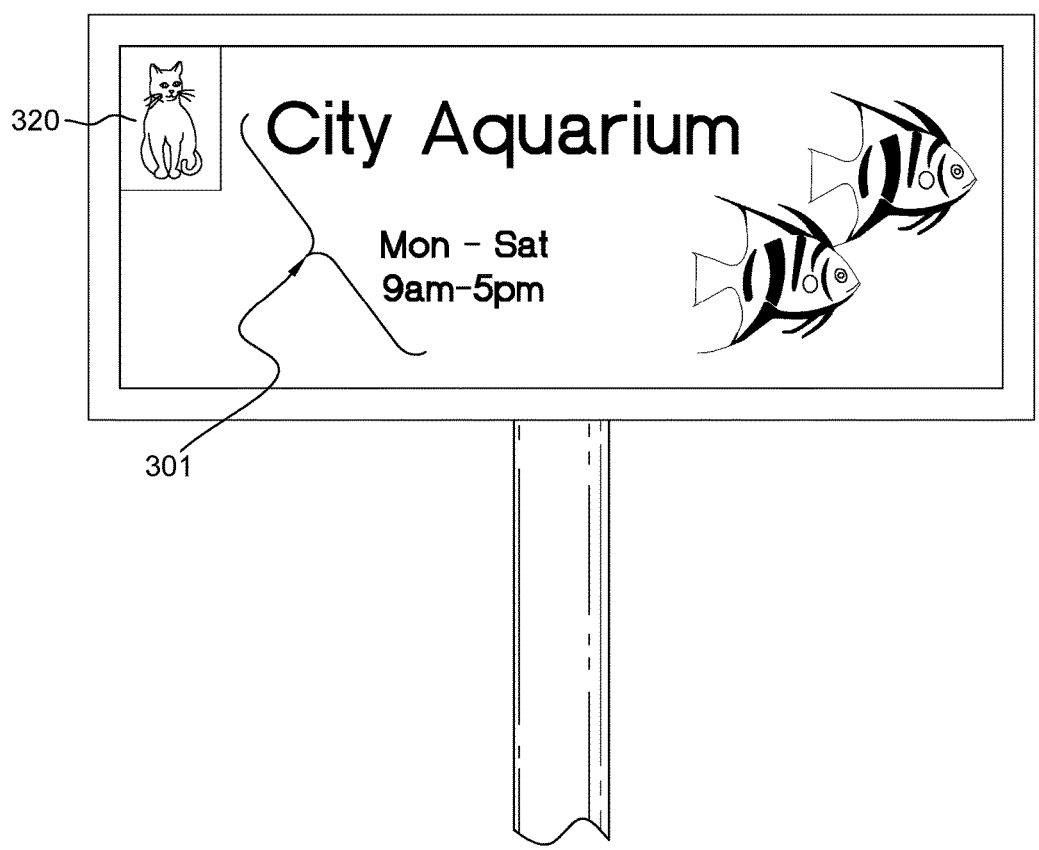

As a further example, in FIG. 3G digital sign 300 is shown modified to include an image 320 which may draw the user's attention depending on the user's interest. In this example, the navigation system has determined that the user is interested in cats, and thus, provides the user with a visual image of a cat within the digital sign to help attract the user's attention as the user traverses along the navigation route through the area.

In the examples of FIGS. 3A-3G, the original content 301 remains within the digital sign. However, in one or more other embodiments, the digital content could be further modified to, for instance, temporarily shrink the original content, or even temporarily remove the original content in order to provide the system with further space in which to provide guidance to the user through the area.

By way of more detailed example, the navigation system may own (e.g., as part of the system), or may reference (for instance, by license or other arrangement) digital signage or infrastructure within an area within or through which a navigation route is to pass. The digital signage may be accessible to the system and include, for instance, dynamic advertising or other notices applicable to the area or region. Note that the phrase digital signs may include any electronic sign, such as scrolling signs, infrastructure mounted signage, standalone signs, such as on posts, rented space on digital signs, imagery and text on moving vehicles, such as city buses, taxis, city vehicles, floating or towable electronic billboards, fixed electronic billboards, etc.

The digital signs within the area may be populated with a variety of city announcements, public service announcements, advertiser content, upcoming schedules, etc. For instance, one digital sign may display content such as "city aquarium" with an image of fish and hours of operation, as well as, optionally, a street name that may be separate from or integrated with a street sign. A digital billboard may advertise "ABC Beer Garden 100 feet ahead" and be disposed, for instance, on the side of a bus stop. One or more digital signs within the area may contain product or service advertisements. Further, one or more digital signs may contain public health announcements, or other public service announcements, and as noted, be on or associated with a vehicle, such as a city bus, taxi, truck, etc. within the area, or even be digital signage on a driverless vehicle, etc.

In one or more embodiments, the system may optionally access one or more databases, such as social media data, which may be accessible to the system across the Internet, as well as any marketing data associated with a particular user or a group of users. If a group of users require directions, the system may know how many users may be obtaining guidance via the digital signs and selectively modify a portion or all of the content of one or more digital signs to be more applicable to that group of users. For instance, if a group of veterinarians will be arriving at the city aquarium, the content of one or more digital signs along the navigation route may relate to veterinary supplies. Alternatively, in one or more other implementations, general information or general modifications may be used such as those described herein to help guide the user or group of users.

In operation, a user requests guidance from the system which, as noted, may include GPS system guidance that is to be supplemented or modified as described herein. For instance, instead of or in addition to, a traditional "turn right in 50 feet onto Jones Road", the system may provide guidance using the dynamic infrastructure of the digital signs, such as "turn right after passing the city bus with the picture of Elmo on the digital sign on the back of the bus", "merge into the left lane near the Nathan's hotdog logo digital sign on the bus stop".

As described herein, the system could also modify or otherwise highlight one or more digital signs along the navigation route as part of the service when the user, who may be walking, biking, driving, etc., is nearby and may be relying on them for guidance. For instance, as noted, the background color of one or more of the digital signs may be changed by the system, a border or other aspect of the digital sign may be made to flash, a particular color border may be provided to draw the user's attention, content of the digital sign may be changed, for instance, to provide advertisement targeted to the user, or the group of users. For instance, content such as "guidance today is sponsored by ABC Company", with content of one or more digital signs along the route being replaced temporarily with this notice making it easier for the driver to follow the navigation route. Digital sign content could be also animated. For instance, if a digital sign contains content with seals lying next to each other, as the user approaches the digital sign, the seals may be animated to flop, drawing the user's attention and confirming that the user is on the correct navigation route. Further, the system could display an image of the digital content to look for on the user's navigation device, in addition to providing the navigation route. For instance, if the user is driving a vehicle, the user's navigation receiver could display an image of the digital sign with the appropriate content to look for.

As noted, while in one or more embodiments the system disclosed herein may be used to facilitate a driver along a travel route, providing a navigation route with references to digital signage may be used for other purposes, such as guided walking tours using the content of the digital signs, as well as smaller electronic signs or billboards, including digital signage and digital posters, digital news rack boards, etc. An example of this use may be in a large conference facility spread within a single venue, or across multiple venues, where interior digital signs may be used to direct the users to the appropriate location. A guided navigational experience could be used to allow the user to better navigate the conference using their navigation device, combined with references to targeted digital signs provided by a system such as disclosed herein.

Figure 4A:
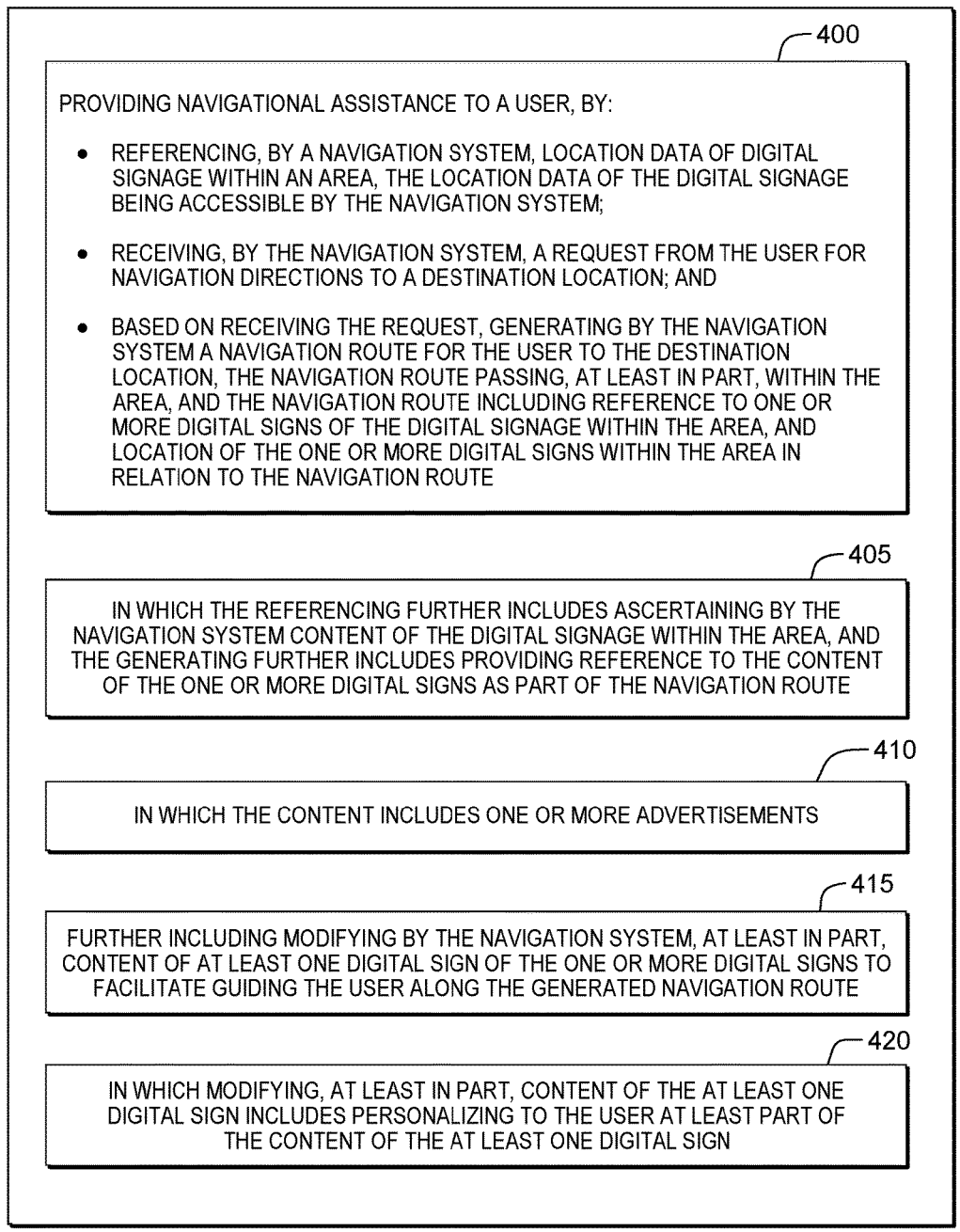
FIGS. 4A-4B depict further embodiments of a method of providing navigational assistance to a user, in accordance with one or more aspects of the present invention.
Figure 4B:
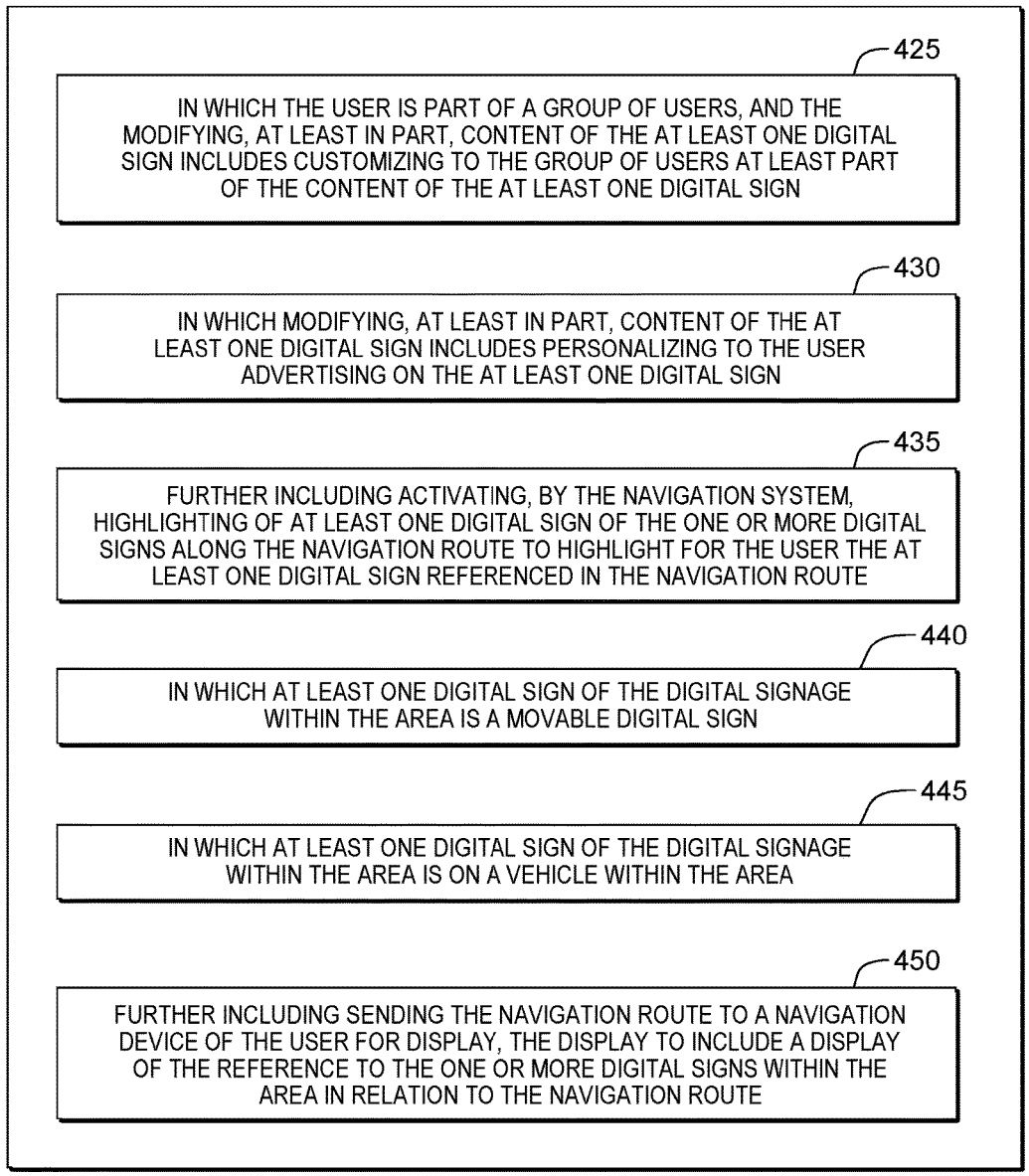

By way of further example, FIGS. 4A & 4B depict methods of providing navigational assistance to a user, in accordance with one or more aspects of the present invention. As illustrated, providing navigational assistance to a user may include referencing, by a navigation system, location data of digital signage within an area, where the location data of the digital signage is accessible by the navigation system. The navigation system may receive a request from the user for navigation directions to a destination location, and based on receiving the request, generate a navigation route for the user to the destination location. The navigation route may pass, at least in part, within the area, and advantageously the navigation route may include reference to one or more digital signs of the digital signage within the area, as well as the location of the one or more digital signs within the area in relation to the navigation route 400.

In one or more embodiments, the referencing by the navigation system may further include ascertaining by the navigation system content of the digital signage within the area, and the generating may include providing reference to the content of the one or more digital signs as part of the navigation route 405. In certain embodiments, the content may include one or more advertisements 410.

In one or more embodiments, providing the navigational assistance may include modifying by the navigation system at least in part, content of at least one digital sign of the one or more digital signs to facilitate guiding the user along the generated navigation route 415. For instance, the modifying, at least in part, content of the at least one digital sign may include personalizing to the user at least part of the content of the at least one digital sign 420. In one or more embodiments, the user may be part of a group of users, and the modifying, at least in part, content of the at least one digital sign may include customizing to the group of users at least part of the content of the at least one digital sign 425. In one or more further embodiments, modifying, at least in part, content of at least one digital sign may include personalizing to the user advertising on the at least one digital sign 430.

In one or more implementations, providing navigational assistance to a user may further include activating, by the navigation system, highlighting of at least one digital sign of the one or more digital signs along the navigation route to highlight for the user the at least one digital sign referenced in the navigation route 435. By way of example, at least one digital sign of the digital signage within the area may be a movable digital sign 440. Further, in one or more embodiments, at least one digital sign of the digital signage within the area may be on a vehicle within the area 445.

In one or more embodiments, providing navigational assistance to a user may further include sending the navigation route to a navigation device of the user for display, where the display is to include a display of the reference to the one or more digital signs within the area in relation to the navigation route 450.

Further exemplary embodiments of a computing environment to implement one or more aspects of the present invention are described below with reference to FIGS. 5-7.

Figure 5:
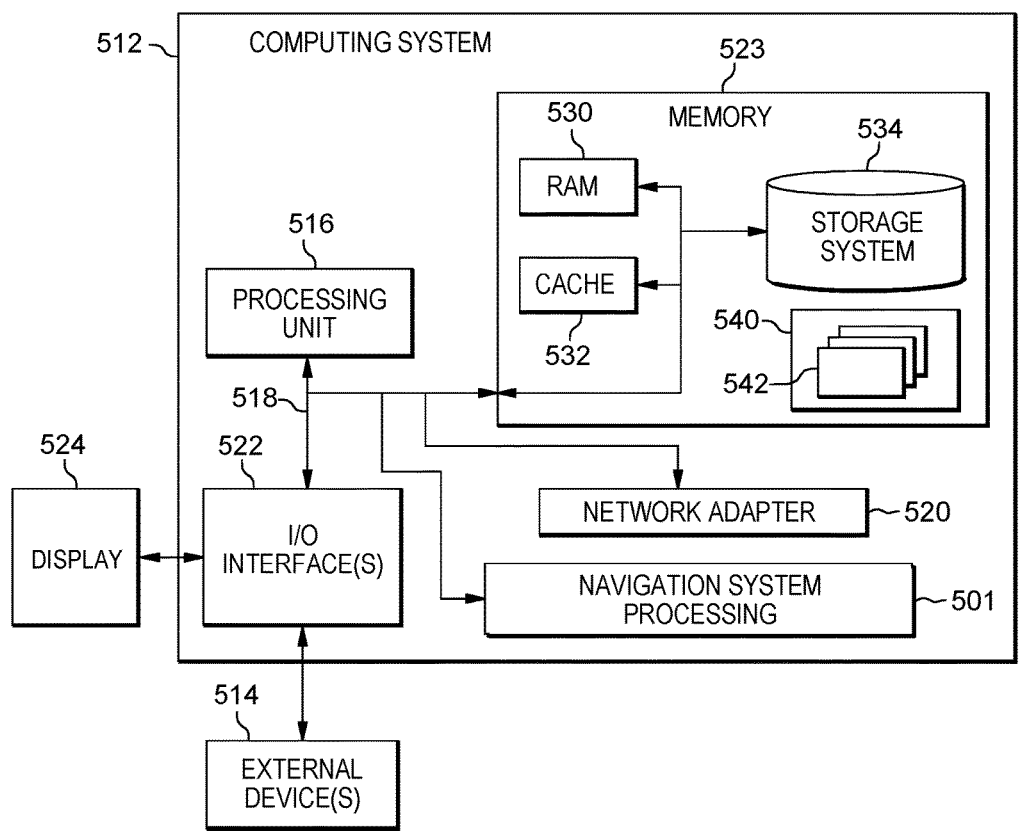
FIG. 5 depicts one embodiment of a computing system which may implement or facilitate implementing navigational system processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a navigation system processing module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
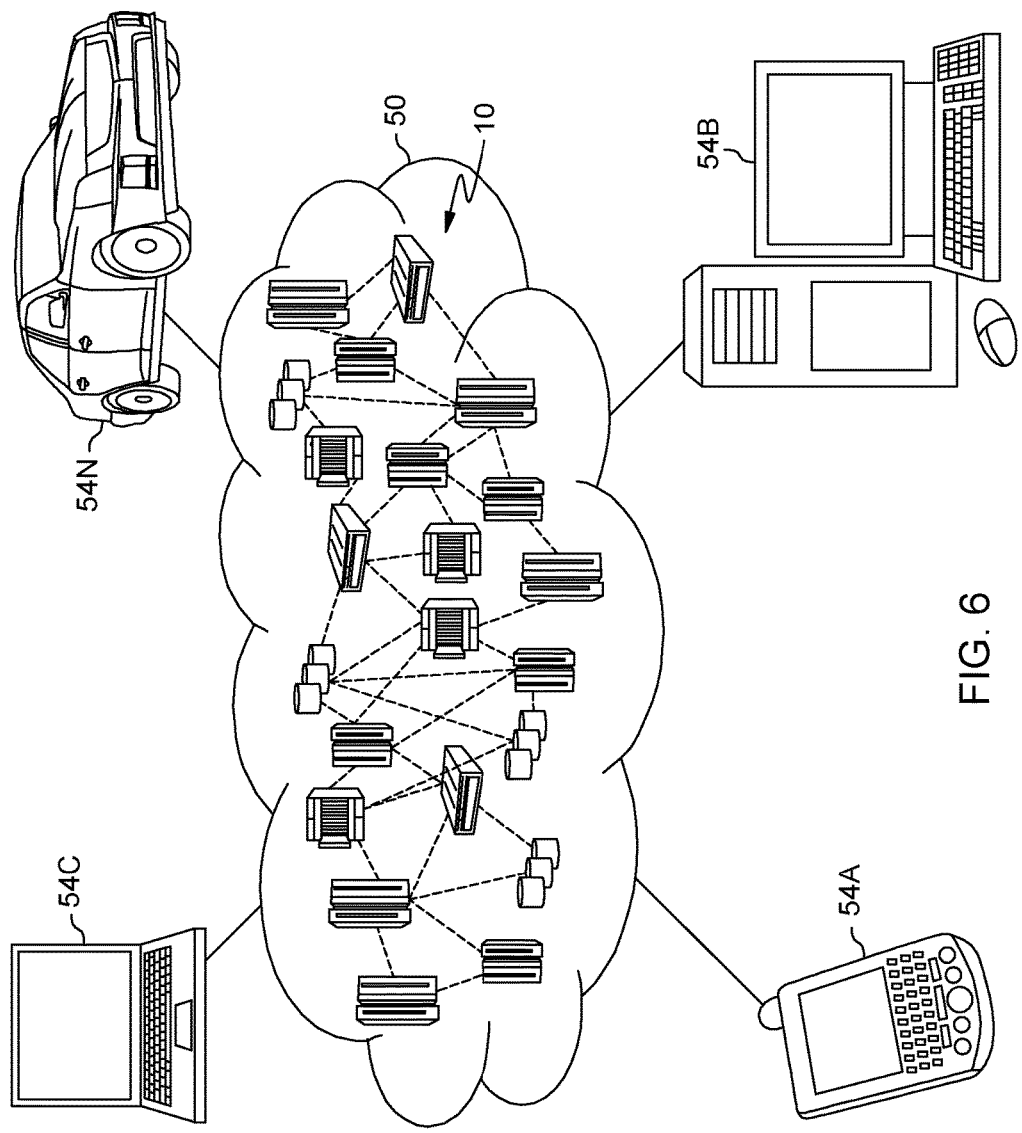
FIG. 6 depicts one embodiment of a cloud computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
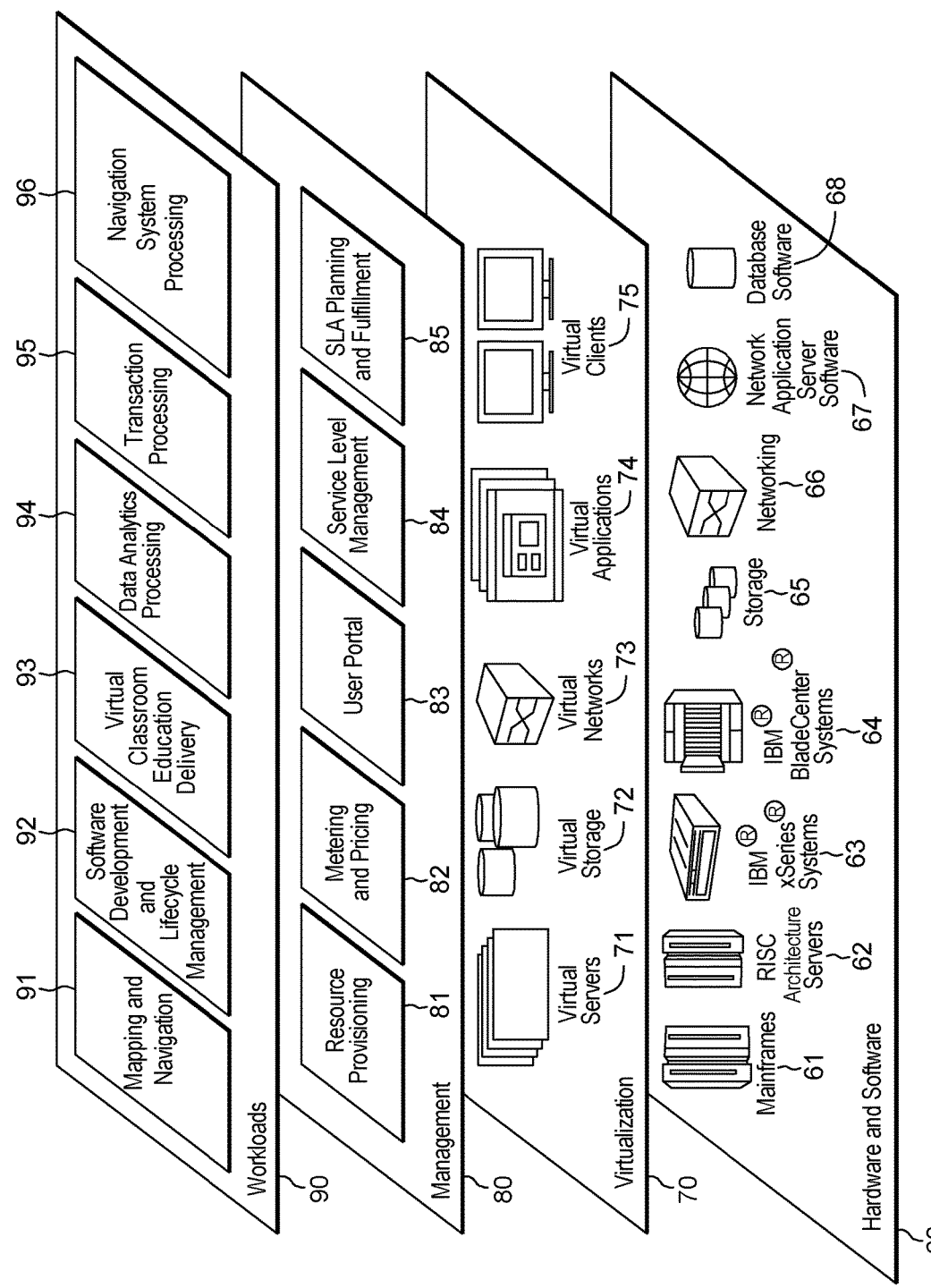
FIG. 7 depicts an example of extraction model layers, which may facilitate implementing navigational system processing, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and navigation system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of providing navigational assistance to a user, the method comprising:
   referencing, by a navigation system, location data of digital signage within an area, the location data of the digital signage being accessible by the navigation system;
   receiving, by the navigation system, a request from the user for navigation directions to a destination location; and
   based on receiving the request, generating by the navigation system a navigation route for the user to the destination location, the navigation route passing, at least in part, within the area, and the navigation route including reference to one or more digital signs of the digital signage within the area, and location of the one or more digital signs within the area in relation to the navigation route.

2. The method of claim 1, wherein the referencing further comprises ascertaining by the navigation system content of the digital signage within the area, and the generating further includes providing reference to the content of the one or more digital signs as part of the navigation route.

3. The method of claim 2, wherein the content comprises one or more advertisements.

4. The method of claim 1, further comprising modifying by the navigation system, at least in part, content of at least one digital sign of the one or more digital signs to facilitate guiding the user along the generated navigation route.

5. The method of claim 4, wherein modifying, at least in part, content of the at least one digital sign comprises personalizing to the user at least part of the content of the at least one digital sign.

6. The method of claim 4, wherein the user is part of a group of users, and the modifying, at least in part, content of the at least one digital sign comprises customizing to the group of users at least part of the content of the at least one digital sign.

7. The method of claim 4, wherein modifying, at least in part, content of the at least one digital sign comprises personalizing to the user advertising on the at least one digital sign.

8. The method of claim 1, further comprising activating, by the navigation system, highlighting of at least one digital sign of the one or more digital signs along the navigation route to highlight for the user the at least one digital sign referenced in the navigation route.

9. The method of claim 1, wherein at least one digital sign of the digital signage within the area is a movable digital sign.

10. The method of claim 1, wherein at least one digital sign of the digital signage within the area is on a vehicle within the area.

11. The method of claim 1, further comprising sending the navigation route to a navigation device of the user for display, the display to include a display of the reference to the one or more digital signs within the area in relation to the navigation route.

12. A system for providing navigational assistance to a user, the system comprising:
   a memory; and
   a processor communicatively coupled to the memory, wherein the system performs a method comprising:
      referencing location data of digital signage within an area, the location data of the digital signage being accessible by the system;
      receiving, by the system, a request from the user for navigation directions to a destination location; and
      based on receiving the request, generating by the system a navigation route for the user to the destination location, the navigation route passing, at least in part, within the area, and the navigation route including reference to one or more digital signs of the digital signage within the area, and location of the one or more digital signs within the area in relation to the navigation route.

13. The system of claim 12, wherein the referencing further comprises ascertaining by the system content of the digital signage within the area, and the generating further includes providing reference to the content of the one or more digital signs as part of the navigation route.

14. The system of claim 13, wherein the content comprises one or more advertisements.

15. The system of claim 12, further comprising modifying by the system, at least in part, content of at least one digital sign of the one or more digital signs to facilitate guiding the user along the generated navigation route.

16. The system of claim 15, wherein modifying, at least in part, content of the at least one digital sign comprises personalizing to the user at least part of the content of the at least one digital sign.

17. The system of claim 15, wherein the user is part of a group of users, and the modifying, at least in part, content of the at least one digital sign comprises customizing to the group of users at least part of the content of the at least one digital sign.

18. The system of claim 15, wherein modifying, at least in part, content of the at least one digital sign comprises personalizing to the user advertising on the at least one digital sign.

19. The system of claim 12, wherein at least one digital sign of the digital signage within the area is on a vehicle within the area.

20. A computer program product for providing navigational assistance to a user, the computer program product comprising:

a computer readable storage medium having computer readable program code embodied therewith, the computer readable program code being executable by a processor to perform a method comprising:

referencing location data of digital signage within an area;

receiving a request from the user for navigation directions to a destination location; and based on receiving the request, generating a navigation route for the user to the destination location, the navigation route passing, at least in part, within the area, and the navigation route including reference to one or more digital signs of the digital signage of the area, and location of the one or more digital signs within the area in relation to the navigation route.

* * * * *